Dec. 13, 1966  R. W. PETERS  3,291,417
WIRE TENSION DEVICE
Filed March 5, 1964
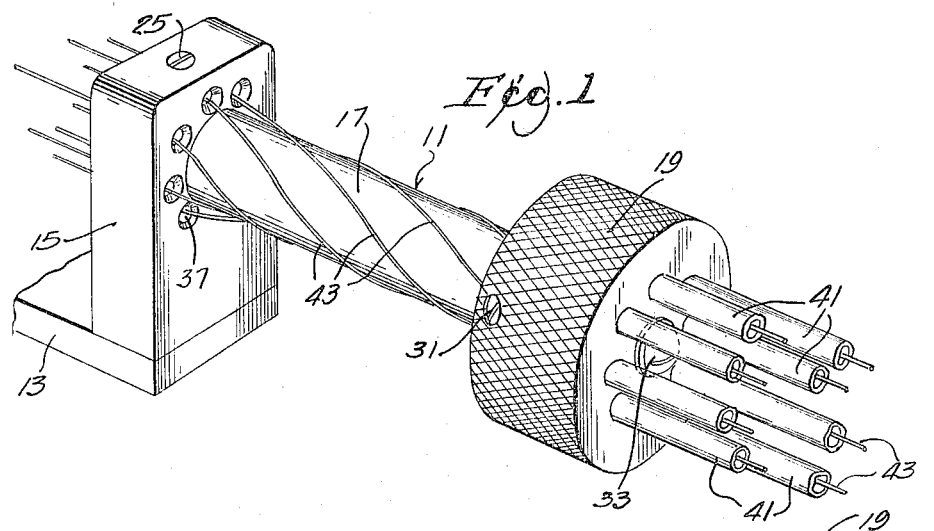
Fig. 1
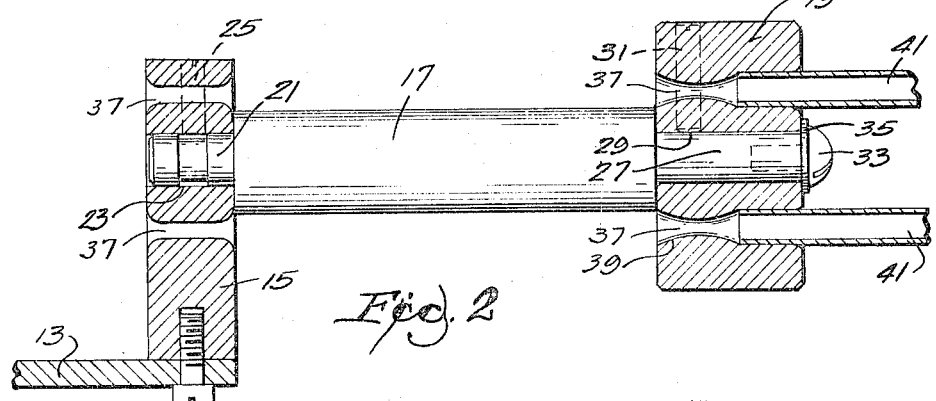
Fig. 2
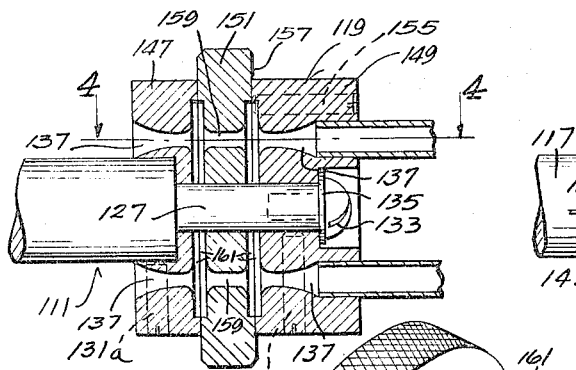
Fig. 3
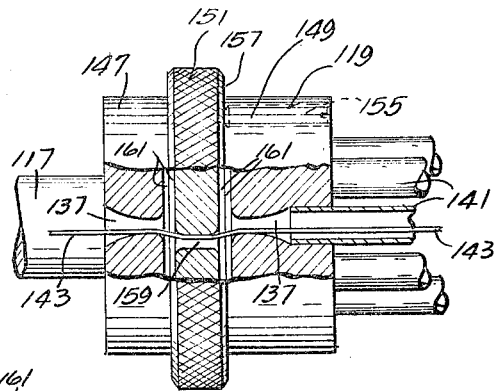
Fig. 4
Fig. 5
INVENTOR.
ROBERT W. PETERS
BY
Wheeler, Wheeler & Wheeler
ATTORNEYS

United States Patent Office 3,291,417
Patented Dec. 13, 1966

3,291,417
WIRE TENSION DEVICE
Robert W. Peters, Menomonee Falls, Wis., assignor to Lincoln Tool and Manufacturing Co., Milwaukee, Wis., a corporation of Wisconsin
Filed Mar. 5, 1964, Ser. No. 349,684
3 Claims. (Cl. 242—147)

The invention relates generally to wire tensioning devices such as are used in connection with coil winding machines.

The invention provides a wire tensioner in the form of an arbor around which the wire to be tensioned is wound, together with an arbor support fixed to one end of the arbor and including a bore through which the wire passes leaving the arbor, and a member which is mounted for angular adjustment at the other end of the arbor and which includes a bore through which the wire passes before traveling around the arbor. By adjusting the angular disposition of the member relative to the arbor, the amount of wire "wrap" around the arbor can be controlled to regulate wire tension. The support and the adjustable member can each be provided with a plurality of bores whereby several wires can be uniformly and simultaneously tensioned as desired.

Certain relatively flexible wires exhibit a tendency to continue movement after discontinuance of the force tending to draw the wire from the tensioning device. This effect is sometimes referred to as "backlash." The invention further provides an arrangement for eliminating backlash by employment of an adjustable member including one or more apertured or bored rings and an apertured or bored disk which can be adjustably angularly offset from the ring or rings to cause wire travel over an obstruction or hump before passage from the adjustable member and around the arbor. The size of the hump, and therefore the force tending to restrain backlash, can be regulated by controlling the amount of angular offset between the ring bores and the disk bores. Other objects and advantages of the invention will become known by reference to the following description and accompanying drawings in which FIGURE 1 is a perspective view of a wire tensioning device in accordance with the invention;

FIGURE 2 is a side elevational view, partially in section, of the device shown in FIGURE 1;

FIGURE 3 is a fragmentary elevational view, partially in section, of a modified construction;

FIGURE 4 is a sectional view taken along line 4—4 of FIGURE 3; and

FIGURE 5 is a perspective view of the disk employed in the embodiment shown in FIGURES 3 and 4.

The wire tensioning device 11 shown in FIGURES 1 and 2 is mounted on any suitable supporting means or frame, such as the bar 13, and includes a support 15, a cylindrically shaped element or arbor 17 extending, at one end, fixedly from the support 15 in cantilever fashion, and a ring member 19 carried at the other end of the arbor 17 for adjustable angular positioning relative to the arbor. Any suitable means can be provided for fixing the arbor on the support. The disclosed construction utilizes a projection 21 at the adjacent end of the arbor, which projection is received in a bore 23 in the support 15 and fixed against rotation and axial displacement by a screw 25.

Any suitable means can be employed for mounting the ring member 19 on the arbor 17 for angular adjustment. In the disclosed construction, such means takes the form of a projection 27 which forms a bearing mating with a central bore 29 in the ring member 19, together with a screw 31 which either releasably fixes the angular position of the ring member 19 relative to the arbor 17 or is used to establish a predetermined frictional resistance to angular movement of the ring member 19 relative to the arbor 17. A machine screw 33 threaded into the projection 27 and a washer 35 are employed to limit axial displacement of the ring member 19 relative to the arbor 17.

Formed in both the support 15 and in the ring member 19 in adjacent relation to the periphery of the arbor 17, are one or more wire passages in the form of apertures or bores 37. Each of the bores 37 has flared outer end portions 39 to afford smooth travel of the wire. The bores 37 in the ring member 19 each communicate with wire conduits, such as nylon sleeves 41, which sleeves leads to a wire source.

In use, a single strand 43 of wire is threaded through one of the nylon sleeves 41, through the communicating bore 37 in the ring member 19, and then around the arbor 17 for a fraction of a complete turn or for more than one turn, depending upon the wire and the conditions of use, and then through one of the bores 37 in the support 15 and to the machine employing the wire.

A desired amount of tension can be obtained by adjustably angularly positioning the ring member 19 to determine the amount of wire "wrap" around the arbor. After a proper setting of the ring member has been achieved to provide the desired tension in the single wire during operating conditions, additional wires can be threaded through and around the device so as to simultaneously subject the several wires to a common tension.

In the event the wire being used is subject to backlash because of its flexibility and operating conditions, the wire tensioning device 111 as shown in FIGURES 3, 4, and 5, can be employed. The wire tensioning device 111 serves to subject the wire to an additional curved passage or hump during wire travel, thereby overcoming wire tendency toward backlash.

The device 111 is generally of the same construction as the device 11, except that the ring member 119 comprises an assembly of two annular rings or segments 147 and 149 and an intermediate disk 151 which can be adjustably located in angular offset relation to the annular rings 147 and 149 to provide the desired humps. Each of the annular rings 147 and 149 includes one or more bores 137 arranged in circular series. Means are provided for releasably fixing or frictionally restraining the annular rings 147 and 149 with respect to the arbor 117 with the bores 137 in respectively aligned condition. In the disclosed construction, such means is in the form of screws 131a and 131b engaging the arbor 117. In addition, a machine screw 133 and washer 135 are employed to prevent axial displacement.

The disk 151 is retained between the annular rings 147 and 149 and can be journalled for rotation relative to the annular rings either on the projection 127 or by a hub on one of the annular rings. In the disclosed construction, the disk 151 is journalled directly on the projection 127.

Various means can be employed to restrain rotative movement of the disk 151 relative to the annular rings 147 and 149. In the disclosed construction, movement of the disk 151 relative to the annular rings is restrained by a screw 155 which bears against one side face 157 of the disk.

The disk includes a series of bores 159 located for alignment with the ring bores 137, each bore 159 including, at each end, a flared mouth. The amount of angular offset between the bores in the disk and the bores in the rings determines the extent of the hump or the obstruction to wire travel which serves to avoid backlash. The facing surfaces of the disk and the annular rings are recessed, as indicated at 161, to afford wire travel when the disk bores 159 are angularly offset from the bores 137 in the annular rings 147 and 149.

In operation, a single strand of wire 143 is threaded through the ring member 119 and around the arbor 117 and through the support as in the embodiment shown in FIGURES 1 and 2. The disk 151 is then angularly offset relative to the annular rings 147 and 149 and the ring member 119, as a whole, is angularly located relative to the arbor to provide both the desired overall tension and the desired restraint to prevent backlash. After the proper setting of the ring member 119 has been established, additional wires can be threaded through the device, each wire being subject to a common resistance to wire travel.

At least some of the advantages of the invention can be obtained with use of a single ring member and a disk.

Various of the features of the invention are set forth in the following claims.

What is claimed is:

1. The combination of a support having an aperture therein, an arbor fixed to said support with one portion of the arbor periphery adjacent to said aperture, a member having a bore therein, means for adjustably rotatably mounting said member on said arbor in spaced relation to said support and with said bore in adjacent relation to the periphery of said arbor, whereby to afford placement of a filament through said aperture, around said arbor through a selectable distance depending upon the angular position of said member and the number of full turns around the arbor, and through said bore, a disk having a bore therein, and means for mounting said disk in adjacent relation to said member and for affording displacement of said disk relative to said member relative to a position wherein said bore in said member and said bore in said disk are in alignment.

2. A wire tensioning device comprising a support having an aperture therein, an arbor fixed to said support with one portion of the arbor periphery adjacent to said aperture, a first member having therein a bore, a second member having therein a bore, and means for mounting said first and second members for angularly adjustably mounting said first and second members on said arbor in spaced relation to said support, and with said bores at a common distance from the axis of rotation of the members, whereby to afford placement of a filament through said aperture, around said arbor through a selectable distance depending upon the angular position of said first member and the number of full turns around the arbor, and through said bores in said first and second members, and for adjustable movement of said first and second members relative to each other, whereby said bores can be selectively located in aligned condition and in predetermined offset condition.

3. A wire tensioning device comprising a support having therein a plurality of holes disposed in a circular series, an arbor fixed to said support in concentric relation to said circular series of holes and with the arbor periphery adjacent to said holes, first, second, and third members each having therein a plurality of bores disposed in a circular series corresponding to said circular series of holes, and means for mounting said first and third members concentrically on said arbor in spaced relation to said support and with said bores in alignment and for common rotative movement relative to said arbor and for mounting said second member intermediate said first and third members for angular adjustable movement relative to said first and third members and for common angular movement with said first and third members relative to said arbor and with said second member bores at a common distance, with respect to said first and third member bores, from the axis of rotation, whereby said second member bores can be selectively located in aligned condition and in predetermined offset condition with respect to said first and third member bores.

References Cited by the Examiner

UNITED STATES PATENTS

| 500,778 | 7/1893 | Sampson | 242—154 |
| 1,596,095 | 8/1926 | Gehman | 242—154 |
| 1,997,709 | 4/1935 | Williams | 242—154 |
| 2,554,286 | 5/1951 | Wilson | 242—150 |
| 3,083,924 | 4/1963 | Vossen et al. | 242—154 X |

FOREIGN PATENTS 490,987  8/1949  Italy.

FRANK J. COHEN, *Primary Examiner.*

MERVIN STEIN, *Examiner.*

W. S. BURDEN, *Assistant Examiner.*